United States Patent Office 3,097,951
Patented July 16, 1963

3,097,951
PROCESS OF MAKING GELLED CONFECTIONS
Joseph E. Greninger, Hillsdale, and Robert A. Lewis, Old Tappan, N.J., assignors to Henry Heide, Incorporated, New Brunswick, N.J., a corporation of New York
No Drawing. Filed Feb. 17, 1960, Ser. No. 9,203
4 Claims. (Cl. 99—134)

This invention relates to a process for manufacturing confections, particularly gelled confections or candies, and more particularly starch base gum candies such as hard gums, gum drops, jelly beans, jelly eggs and other types of candy in which the candy body is produced by the gelatinization of starch.

Heretofore, confections such as those enumerated have been made by first preparing a dilute slurry of sugar, starch, corn syrup, excess water and, optionally, dextrose or invert sugar. In order to properly gelatinize the starch in the presence of sugars, it is customary to use approximately one gallon of water for every pound of starch present in the formulation. The batch is then boiled for a long period of time at atmospheric pressure until the starch is fully gelatinized and the batch is judged to be of the proper consistency for casting into molding starch. The termination of the cooking operation is at the discretion of the operator, and is usually determined by observing the consistency of the gum mass on a palette knife, spatula or paddle. This method requires skill and experience on the part of the operator, and also affords much room for error since batches may be cooked past the optimum point or the cooking may be terminated before this point has been reached. Also, this process requires the consumption of great quantities of steam in boiling off the necessarily large volume of water to reduce the moisture content of the batch to the point where the gum candy mass is of the proper solids and consistency for casting into molding starch.

In recent years, continuous short time cooking methods have been developed, e.g., by introducing live steam into the slurry. These methods have serious draw backs, since the mixing of live steam results in moisture pickup by the product and possible contamination thereof by any impurities within the steam. Also, the cooking is so rapid that sufficient inversion of the sucrose to invert sugar does not take place in the operation. Therefore, in order to insure a tender texture and long shelf life to the candy it is necessary to add some commercially available invert sugar to the formulation. This material is substantially more costly than sucrose. It would be more economical, therefore, to form the invert sugar in the cooking operation.

A fundamental object of this invention is to provide a controlled method of producing invert sugar in the manufacture of a starch gum candy batch. By adjusting the conditions of time and temperature and by controlling the acidity of the batch, any desired amount of invert sugar can be formed by the controlled inversion of the sucrose in the starch gum candy batch. This results in fully automatic batch cooking and dispenses with skilled operators.

It is also an object of this invention to produce starch base gum candies economically by eliminating the boiling off of large quantities of water. According to the present invention, the quantity of water in the candy mass after cooking is the same as that in the ingredients introduced into the cooker. This provides a great saving in the steam required for manufacturing these candies. Since steam is not injected itno the candy mass, no special treatment of the steam is necessary to insure the cleanliness of the steam.

A further object of this invention is to produce an extremely clear starch base gum candy by insuring the optimum gelatinization of the starch in the batch by cooking under superatmospheric pressure for an extended period of time.

Another object of this invention is to produce a starch gum candy of very good quality by using the less expensive type of starch generally referred to as "common cornstarch." Heretofore, this has not been practicable.

Still another object is to provide a process for the manufacture of starch base gum candies in which flavors and colors may be added before the cooking process. In this process both make-up and receiving kettles may be eliminated, as the process is carried out in a closed vessel under pressure and there is no loss of volatile flavors. Also, all ingredients may be placed directly into the processing equipment, thus eliminating the need of a make-up or slurry kettle.

The foregoing objects are realized according to the method of the present invention by preparing a slurry of cornstarch and other carbohydrates and cooking same in a closed pressure vessel by the application of external heat. The cooking time varies between about 5 and about 30 minutes at pressures up to about 50 p.s.i. and at temperatures ranging between about 240° to about 300° F., with continuous moderate agitation.

The amount of invert sugar formed by inversion of sucrose is controlled by varying within the formulation a quantity of citric acid or other inverting agent, and by controlling the cooking time and the temperature. The quantity of sucrose inverted is thereby adjusted according to the desired texture of the finished confection. After the slurry has been cooked, it is cooled and formed into confection pieces.

The process may be carried out in a steam-jacketed, batch size closed kettle or vessel capable of withstanding internal pressures of up to 50 p.s.i., and having motor driven, scraper blade type agitators operating at moderate speeds. The steam jackets may be used for circulating cold water for the cooling operation, and compressed air may be introduced into the kettle to facilitate the discharge of the cooled slurry.

The ingredients may be weighed or measured directly into the processing kettle, or made into a slurry in a make-up kettle and then transferred to the processing vessel.

The foregoing and other objects and advantages of the method of the present invention will appear from the following description of specific examples of the application of the invention to practice.

*Example 1*

The following ingredients were placed in the processing vessel:

Sugar (sucrose) _____ lbs__ 80
Corn syrup, 43° Bé _____ lbs__ 120
Starch (thin boiling, 60 fluidity) _____ lbs__ 30
Water _____ lbs__ 54
Citric acid _____ ozs__ 2.5

The corn syrup was standard commercial 43° Bé containing approximately 80% solids and having a dextrose equivalent of 42. The starch was standard thin boiling starch prepared for confectionery use and designated as 60 fluidity by the manufacturer. Starches or other fluidities may be used.

The ingredients were placed into the processing vessel with the agitator running at approximately 30 r.p.m. in order to afford good mixing. After the ingredients were added, the vessel was tightly closed and steam at a pressure of approximately 80 p.s.i. was introduced into the wall jackets of the vessel. When the internal pressure reached 15 p.s.i., the external steam pressure was reduced so that an internal vessel pressure of 15 p.s.i. was maintained for a period of 10 minutes. An internal temperature of 240° to 250° F. was maintained in the candy mass during this time. At the end of the cooking operation the batch was cooled and then valved into lines to the hopper of a starch depositor, or to a receiving kettle in which colors and flavors were added. The solids content of the mass was approximately 72% after cooking, which is essentially the same as the solids content of the ingredients in the make-up batch. A fully gelatinized starch base gum candy was obtained.

This candy, upon being deposited in molding starch and thereafter adjusting the drying cycle, may be made into either hard gums or sugar rolled gum candy with excellent shelf life. The candy has a chewy, yet tender texture, and also has exceptional clarity for candy of this type.

In this process, approximately 50% of the sucrose is inverted by means of the citric acid to form invert sugar. It is evident that by varying within the formula the amount of citric acid or other inverting agent, the time of cooking and the processing temperature, the quantity of sucrose inverted can be adjusted according to the texture desired.

*Example II*

| | Lbs. |
|---|---|
| Sugar (sucrose) | 60 |
| Corn syrup | 140 |
| Dextrose hydrate | 50 |
| Starch (thin boiling, 60 fluidity) | 37 |
| Water | 54 |

The corn syrup and starch were as described in Example I. Dextrose hydrate is the commercially available monohydrate of dextrose which contains approximately 91.5% solids and is sold under trade names such as "Cerelose" and "Clintose."

The ingredients were placed into the processing vessel and cooked as in the foregoing example. At the end of the cooking operation, the batch was cooled and valved into lines to the hopper of a starch depositor and the candy mass was deposited and dried in molding starch to the desired moisture content. Since no acid was added, very little of the sucrose was inverted to form invert sugar in the process. Thus a firm textured product resulted.

This candy may be used as jelly bean centers, jelly egg centers, or in other types of starch base sugar rolled gum goods in which a relatively firm texture is desired.

*Example III*

| | | |
|---|---|---|
| Sugar (sucrose) | lbs | 80 |
| Corn syrup | lbs | 120 |
| Starch (common pearl) | lbs | 30 |
| Citric acid | ozs | 2.5 |
| Water | lbs | 60 |

The corn syrup was as described in the previous examples. The starch was a food grade cornstarch in which no modification had been made to afford it any special properties.

The ingredients were placed in the processing kettle and cooked and processed as in Example II, except that the kettle pressure of 15 p.s.i. was maintained for approximately 15 minutes at an internal temperature of 250° to 260° F. The moisture content of the mass was approximately 29% after cooking, thus essentially the same as the moisture content of the ingredients in the make-up batch.

A clear, fully gelatinized starch base gum candy is obtained by this process. The starch by action of heat, acidity and pressure is modified in the operation to the extent that its properties resemble those of the thin boiling starch usually employed in the processing of starch base gum candies. This process is suitable for the manufacture of hard starch base gum candies with a very good texture and clarity.

In the above exemplified formulations essential oils and other flavors, as well as coloring materials may be added prior to cooking since there is no volatilization in the operation.

The invention may be employed in the production of related forms of gum candies such as gum drops, orange slices, spice drops, etc.

It should be understood that the foregoing examples of the method of carrying out the present invention are illustrative only, and that modifications thereof will present themselves to those skilled in the art without departing from the scope of the invention as defined in the appended claims.

We claim:

1. The method of producing a starch base candy which comprises, forming in a kettle capable of withstanding in its closed condition relatively high internal pressures, a large batch of an aqueous slurry composed of starch and sugar, tightly closing the kettle against substantial loss of the ingredients of the batch during the cooking step, then while maintaining the closed kettle static with the batch of slurry held therein as a unitary solid candy mass, heating such mass through the enclosing wall of the kettle from that side of the mass which is in contact with the inner surface of such wall, by subjecting the exterior side of such wall to steam of relatively high pressure until the mass rises to a given temperature within the range of from 240° to 300° F. and there is produced within the closed kettle a given internal pressure within the range of from 10 to 50 p.s.i., reducing the high external steam pressure to such extent that the temperature of the steam is capable of maintaining the candy mass at such given internal pressure and temperature for a prolonged period and then cooking the candy mass by maintaining it at such given internal pressure and temperature for a period of from 5 to 30 minutes and until the starch in the mass has been fully gelatinized, then while maintaining the gelatinized candy mass in the stationary closed kettle, cooling the mass by applying a coolant to the exterior side of said enclosing wall of the kettle until such mass has cooled to the desired temperature for removal from the kettle, and then removing the cooked candy mass from the kettle.

2. The method defined in claim 1, in which the starch used in forming the batch of aqueous slurry in the kettle is common food grade cornstarch and in which the candy mass is cooked at the given internal pressure and temperature until the common starch has been modified to the extent that the candy mass is converted into a clear, fully gelatinized starch base gum candy.

3. The method defined in claim 2, in which the candy mas throughout the cooking period is subjected to a continuous moderate agitation to distribute continuously throughout such mass the heat applied thereto through the enclosing wall of the kettle and therby to maintain such mass substantially uniformly at the given pressure and temperature while it is being fully gelatinized.

4. The method of producing a starch base candy by using an inverting agent in the presence of starch to modify the sugar as the candy is being made, comprising forming in a kettle capable of withstanding in its closed condition relatively high internal pressures, a large batch of an aqueous slurry composed of starch, sugar and a food grade acidic sugar inverting material, tightly closing the kettle against substantial loss of the ingredients of the batch during the cooking step, then while maintaining the closed kettle static with the batch of slurry held therein as a unitary solid candy mass, heating such mass through the enclosing wall of the kettle from that side of the mass which is in contact with the inner surface of such wall, by subjecting the exterior side of such wall to steam of relatively high pressure until the mass rises to a given temperature within the range of from 240° to 300° F. and there is produced within the closed kettle a given internal pressure within the range of from 10 to 50 p.s.i., said given internal pressure and temperature being such that said inverting material will modify the sugar at a given controlled rate throughout the cooking period of the candy mass, reducing the high external steam pressure to such extent that the temperature of the steam is capable of maintaining the candy mass at such given internal pressure and temperature for a prolonged period and then cooking the candy mass by maintaining it at such given internal pressure and temperature for a period of from 5 to 30 minutes and until the starch in the mass has been fully gelatinized and such substantial given quantity of the sugar has been inverted as to provide the candy with a desired texture, then while maintaining the gelatinized candy mass in the stationary closed kettle, cooling the mass by applying a coolant to the exterior side of said enclosing wall of the kettle until such mass has cooled to the desired temperature for removal from the kettle, and then removing the cooked candy mass from the kettle.

References Cited in the file of this patent

UNITED STATES PATENTS 2,726,960     Bolanowski  ------------ Dec. 13, 1955

OTHER REFERENCES

"Confectionery Standards," by Jordan, Applied Sugar Laboratories, Inc., 109 Wall Street, New York, 1933, page 19.